(12) United States Patent
Shuck

(10) Patent No.: US 10,954,803 B2
(45) Date of Patent: Mar. 23, 2021

(54) ABRASIVE COATING FOR HIGH TEMPERATURE MECHANICAL SYSTEMS

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 104 days.

(21) Appl. No.: 16/250,752

(22) Filed: Jan. 17, 2019

(65) Prior Publication Data

US 2020/0232333 A1     Jul. 23, 2020

(51) Int. Cl.
```
F01D 5/28    (2006.01)
C09K 3/14    (2006.01)
C22C 19/05   (2006.01)
```

(52) U.S. Cl.
CPC ............ F01D 5/288 (2013.01); C09K 3/1409 (2013.01); C22C 19/05 (2013.01); F01D 5/282 (2013.01); F01D 5/284 (2013.01); F01D 5/286 (2013.01); *F05D 2300/6033* (2013.01)

(58) Field of Classification Search
None
See application file for complete search history.

(56) References Cited

U.S. PATENT DOCUMENTS

| | | | | |
|---|---|---|---|---|
| 4,060,250 A | * | 11/1977 | Davis ...................... | F04D 29/02 277/415 |
| 4,148,494 A | * | 4/1979 | Zelahy .................... | F01D 11/02 277/415 |
| 4,522,692 A | * | 6/1985 | Joslin ...................... | B23H 3/04 204/224 M |
| 4,680,199 A | * | 7/1987 | Vontell .................... | F01D 11/12 427/199 |
| 4,741,973 A | * | 5/1988 | Condit .................... | B22F 1/025 428/553 |
| 4,936,745 A | * | 6/1990 | Vine ........................ | C23C 4/02 415/173.4 |

(Continued)

FOREIGN PATENT DOCUMENTS

| | | |
|---|---|---|
| EP | 3213854 A1 | 9/2017 |
| WO | 2016061585 A1 | 4/2016 |

OTHER PUBLICATIONS

Partial Search Report from counterpart European Application No. 19215750.1, dated Jun. 9, 2020, 5 pp.

(Continued)

*Primary Examiner* — Michael Lebentritt
(74) *Attorney, Agent, or Firm* — Shumaker & Sieffert, P.A.

(57) ABSTRACT

In some examples, a method for forming an abrasive coating on a component (e.g., a turbine blade, vane, or knife ring) of a gas turbine engine. The method may include forming an abrasive coating system on a substrate, the abrasive coating system including an abrasive coating including a plurality of abrasive particles in a metal matrix; machining the abrasive coating on the substrate to define a machined abrasive coating having an abrasive coating thickness profile; and etching an outer surface of the machined abrasive coating to remove a portion of the metal matrix and form an etched metal matrix such that the abrasive particles protrude from the metal matrix.

20 Claims, 8 Drawing Sheets

(56) References Cited

U.S. PATENT DOCUMENTS

| | | | | |
|---|---|---|---|---|
| 5,104,293 | A * | 4/1992 | Eaton, Jr. | C23C 4/06 416/241 B |
| 5,264,011 | A | 11/1993 | Brown et al. | |
| 5,359,770 | A | 11/1994 | Brown et al. | |
| 5,551,840 | A | 9/1996 | Benoit et al. | |
| 5,603,603 | A * | 2/1997 | Benoit | F01D 11/12 415/173.4 |
| 5,665,217 | A | 9/1997 | Gruver et al. | |
| 5,704,759 | A * | 1/1998 | Draskovich | F01D 11/12 415/170.1 |
| 5,756,217 | A * | 5/1998 | Schroder | F01D 5/20 428/148 |
| 5,897,920 | A * | 4/1999 | Sileo | C23C 4/10 427/450 |
| 6,190,124 | B1 * | 2/2001 | Freling | C23C 28/321 415/173.4 |
| 6,194,086 | B1 | 2/2001 | Nenov et al. | |
| 8,240,675 | B2 * | 8/2012 | Hirakawa | C23C 4/06 277/412 |
| 8,266,801 | B2 | 9/2012 | Clark et al. | |
| 9,746,085 | B2 * | 8/2017 | Bode | F01D 11/02 |
| 10,072,506 | B2 | 9/2018 | Shuck | |
| 2005/0129511 | A1 * | 6/2005 | Allen | C23C 30/00 415/173.4 |
| 2006/0222891 | A1 * | 10/2006 | Weber | C22C 27/06 428/697 |
| 2010/0000160 | A1 * | 1/2010 | Lugg | B24B 37/245 51/297 |
| 2010/0266862 | A1 * | 10/2010 | Lugg | B24D 18/0072 428/551 |
| 2013/0295821 | A1 * | 11/2013 | Lugg | B24B 37/245 451/59 |
| 2015/0275679 | A1 * | 10/2015 | Strock | B05D 1/02 427/258 |
| 2015/0377039 | A1 * | 12/2015 | Shuck | B23K 35/22 415/170.1 |
| 2016/0356165 | A1 * | 12/2016 | Strock | F01D 5/02 |
| 2017/0144270 | A1 * | 5/2017 | Twomey | B24C 1/00 |
| 2017/0314570 | A1 * | 11/2017 | Strock | C23C 16/00 |
| 2018/0030993 | A1 * | 2/2018 | Strock | B23P 15/02 |
| 2018/0355735 | A1 | 12/2018 | Shuck | |
| 2019/0003486 | A1 * | 1/2019 | Strock | F01D 11/122 |
| 2019/0085865 | A1 * | 3/2019 | Strock | F01D 11/122 |
| 2019/0186281 | A1 * | 6/2019 | Stoyanov | F01D 25/005 |
| 2020/0025016 | A1 * | 1/2020 | Seymour | B32B 7/05 |

OTHER PUBLICATIONS

Extended Search Report from counterpart European Application No. 19215750.1, dated Sep. 9, 2020, 11 pp.

* cited by examiner

ABRASIVE COATING FOR HIGH TEMPERATURE MECHANICAL SYSTEMS

TECHNICAL FIELD

The present disclosure generally relates to coating systems for high-temperature mechanical systems, such as gas turbine engines.

BACKGROUND

The components of gas turbine engines operate in severe environments. For example, the high-pressure turbine airfoils exposed to hot gases in commercial aeronautical engines typically experience surface temperatures of about 1000° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating to reduce heat transfer from the external environment to the substrate, an environmental barrier coating to reduce exposure of the substrate to environmental species, such as oxygen, water vapor, or Calcia-Magnesia-Alumina Silicate (CMAS) containing materials, an abradable coating to improve a seal between the substrate and an adjacent component, or combinations thereof.

SUMMARY

In some examples, the disclosure is directed to techniques for forming abrasive coatings on substrates, such as, a substrate of a component used in high-temperature gas turbine engine. In some examples, the abrasive coating may be formed on turbine blades, turbine vanes, and/or knife rings such that the abrasive coating abrades an abradable coating on an opposing component during operation of the turbine engine. The abradable and abrasive coatings may be parts of a system that forms a fluid seal between the opposing components through the abrasion of the abradable layer during operation of the engine, e.g., to improve the efficiency of the engine. As will be described below, the abrasive coating may be machined and etched following the initial formation of the abrasive coating on a substrate. The machining and etching may provide for an abrasive coating having a desired layer thickness profile with abrasive particles protruding from the metal matrix of the abrasive coating.

In one aspect, the disclosure is directed to a method comprising forming an abrasive coating system on a substrate, the abrasive coating system comprising an abrasive coating including a plurality of abrasive particles in a metal matrix; machining the abrasive coating on the substrate to define a machined abrasive coating having an abrasive coating thickness profile; and etching an outer surface of the machined abrasive coating to remove a portion of the metal matrix and form an etched metal matrix such that the abrasive particles protrude from the metal matrix In another aspect, the disclosure is directed to a gas turbine engine system comprising a first component; an abrasive coating on at least a portion of the first component; a second component; and an abradable coating on at least a portion of the second component, wherein the abrasive coating comprises a plurality of abrasive particles protruding from a metal matrix, and wherein, during operation of the gas turbine engine, the first component is configured to move relative to the second component such that the abrasive coating abrades into the abradable coating.

The details of one or more examples are set forth in the accompanying drawings and the description below. Other features, objects, and advantages will be apparent from the description and drawings, and from the claims.

DETAILED DESCRIPTION

Figure 1:
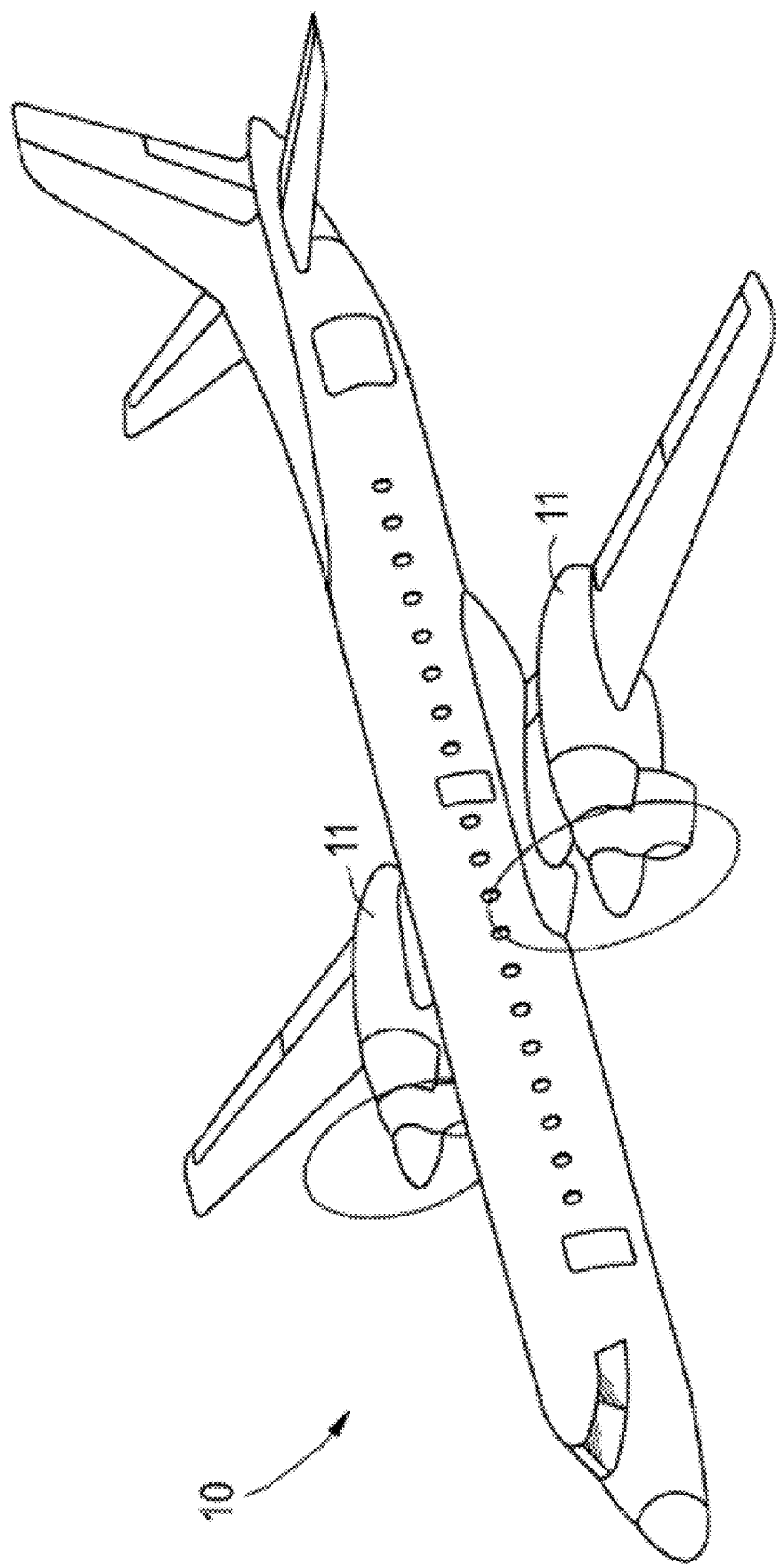
FIG. 1 is a conceptual diagram of an aircraft including example gas turbine engines.

As noted above, in some examples, the disclosure is directed to techniques for forming abrasive coatings on substrates, such as, a substrate of a component used in high-temperature gas turbine engine. A turbine in a gas turbine engine may be formed from a plurality of blade stages coupled to discs that are capable of rotating about an axis. Each stage may be formed from at least one rotor and at least one stator. Each rotor may include a plurality of turbine blades spaced circumferentially around a respective disc or an integral disc and blades referred to as a blisk. Each stage may also include at least one set of non-rotating stators upstream of the rotors. The turbine blades may have tips that are located in close proximity to a shroud in a casing that encloses the turbine. A large gap between the blade tip and the shroud may decrease the efficiency of the turbine through over-tip leakage. A narrow gap increases the risk of "tip rub" where the tip comes into contact with the shroud and causes excessive wear on the components, resulting in damage or even failure of the blade, shroud, or both.

In some examples, the tips of the blades may be coated with abrasive particles such as cubic boron nitride (CBN). The particles in the coating may allow the blade tip to abrade or otherwise cut into an abradable coating on the blade shroud during the first use of the blade and establish a tip gap. It is desirable for the particles to remain attached to the turbine tip throughout the life of the tip so that the particles can later cut the seal to compensate for blade changes caused, e.g., by creep during the life of the blade.

In some examples, the abrasive coating on the tips of the blade may be deposited using an electroplating process. In some examples, the abrasive coating may be used as deposited or may undergo post deposition machining. However, the electroplating deposition process may form an abrasive coating that has poor adhesion, is susceptible to bubbling, and/or results in the coating being formed on undesired portions of the blade substrates other than the blade tips.

In accordance with examples of the disclosure, an abrasive coating including abrasive particles in a metal matrix may be initially formed on a substrate such as on the blade tip of a turbine blade. In some examples, the abrasive coating may be formed on the blade tip via directed energy deposition. The abrasive coating may then be machined such that the abrasive coating defines a desired layer thickness profile. The abrasive coating may also be surface etched to remove a portion of the metal matrix so that the abrasive particles are exposed and protrude from the metal matrix.

In some examples, such post processing following formation of the abrasive coating may allow for directed energy deposition or other type of deposition of the abrasive coating, e.g., since the abrasive coatings, as deposited, may have undesirable variations in layer thickness. The machining of such abrasive coatings following the initial deposition allows for machining to more exact or precise dimensions, either at a component level or an assembly level. The machining may allow for tighter clearances on the sealing surfaces, a reduction in leakage, and/or an increase in engine power and/or efficiency. Additionally, the selective etching of the abrasive coating exposes the particles of the coating on the abrasive grit and allows the particles to protrude from the metal matrix. As such, the cutting/abrasive surface of the coating may have increased cutting/abrasion effectiveness and reduce rub between the metal matrix of the abrasive coating and the adjacent component.

Figure 2:
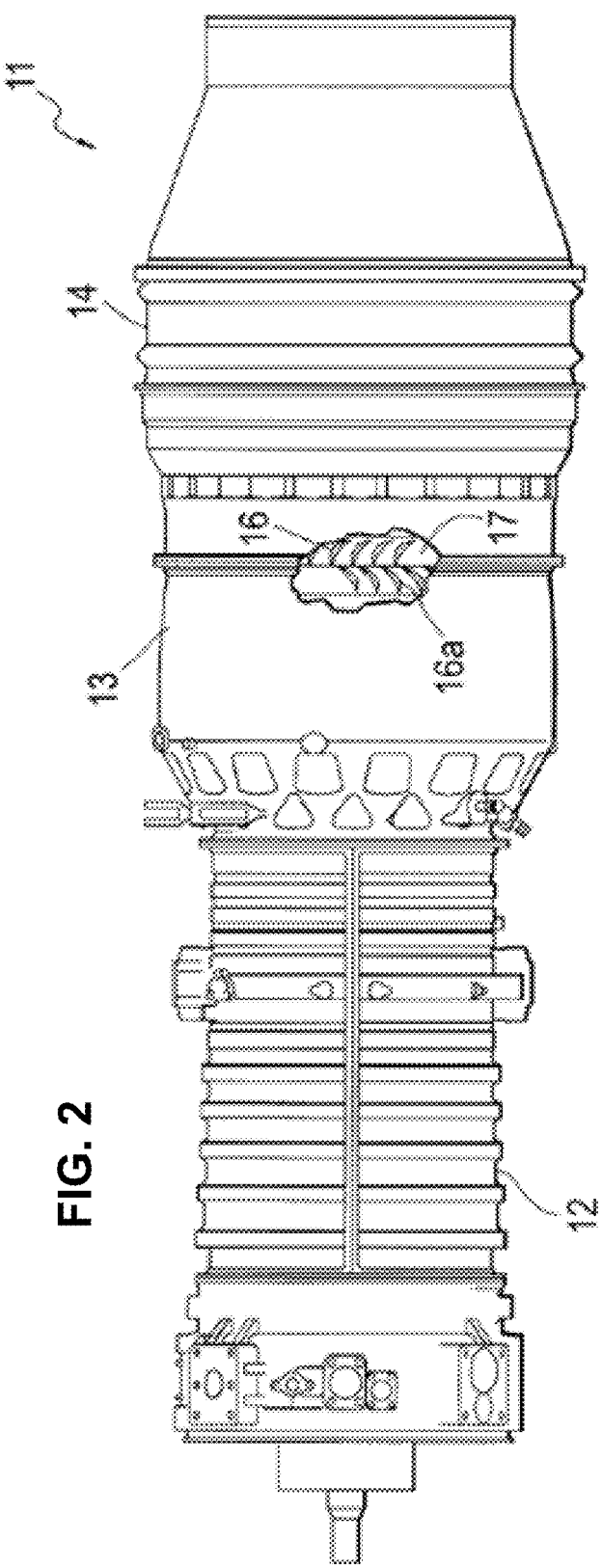
FIG. 2 is a conceptual schematic diagram illustrating an enlarged partially fragmented side elevational view of an example gas turbine engine of FIG. 1.

Referring to FIGS. 1 and 2, there is illustrated aircraft 10 including two gas turbine engines 11. It is understood herein that an aircraft is generic and includes helicopters, tactical fighters, trainers, commercial aircraft, missiles and other related apparatus. Furthermore, examples of the disclosure are not limited to aircraft but may include any vehicle including a gas turbine engine. Similarly, a gas turbine engine refers to any one of a turboprop, turbofan, turbojets, a turbogenerator, or the like.

In one example, engines 11 each includes compressor 12, combustor 13 and power turbine 14. It is recognized that there are a multitude of ways in which the components of engine 11 may be linked together. Additional compressors and turbines can be added with or without intercoolers connected between the compressors and reheat combustion chambers could be added between the turbines, and the engine may be geared or not geared. Further, the gas turbine engine is equally suited to be used for industrial applications.

With reference to FIG. 2, there is illustrated an enlarged partially fragmented view of gas turbine engine 11. Gas turbine engine 11 includes a rotor disk 17, with a plurality of turbine blades 16 mounted thereto, that is coupled to a shaft (not illustrated) within gas turbine engine 11. Alternatively, the plurality of turbine blades 16 and rotor disk 17 may be replaced with an integral blisk. Plurality of turbine vanes 16a form a nozzle or stator within the gas turbine engine for directing the flow of working fluid relative to blades 16. In one example, the working fluid is air extracted from the compressor 12.

Figure 3:
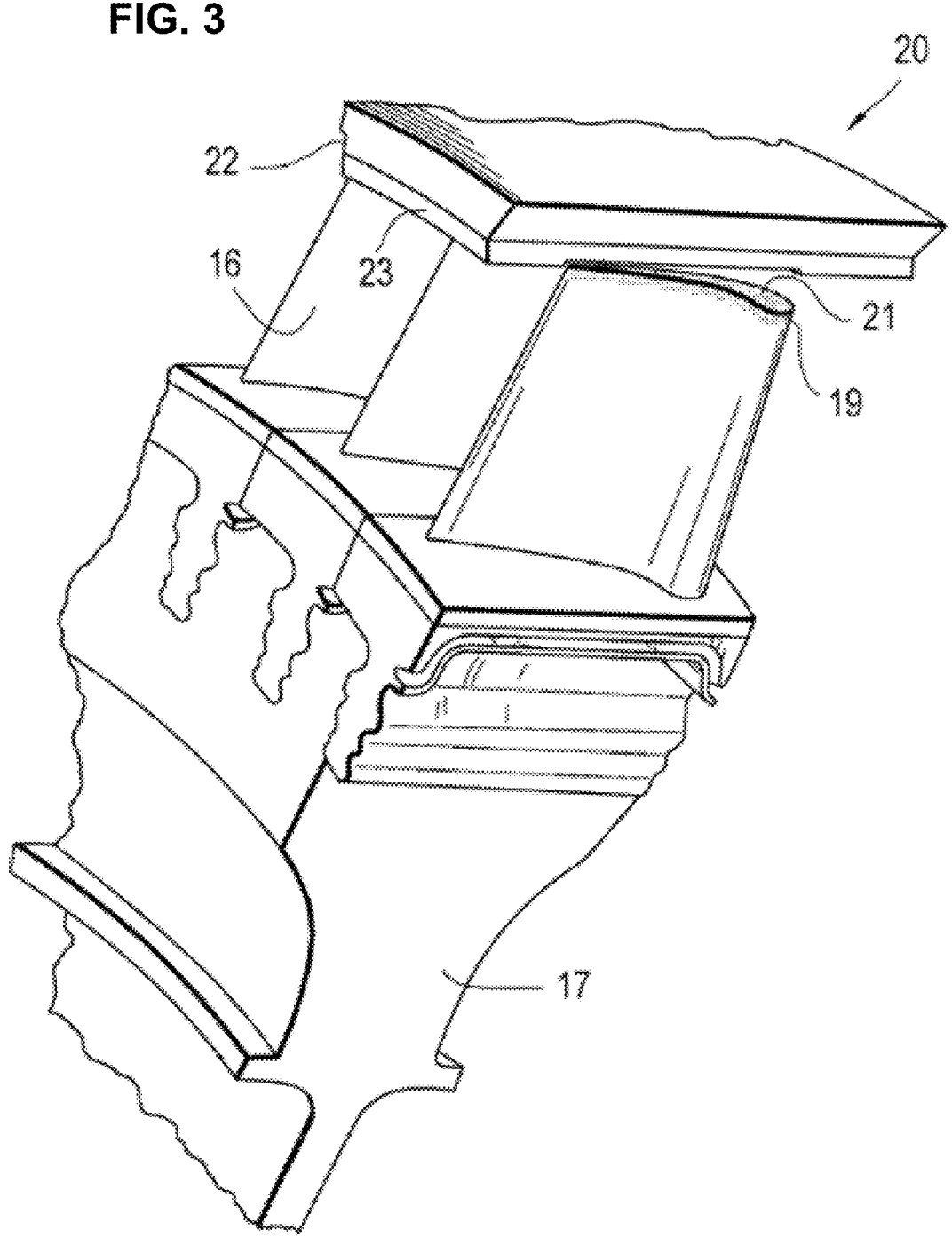
FIG. 3 is a conceptual schematic diagram illustrating a partial perspective view of one example of an abradable/abrasive seal system including a portion of the gas turbine engine of FIG. 2.

With reference to FIG. 3, there is illustrated a portion of working fluid sealing system 20. Sealing system 20 may be configured to minimize the leakage of working fluid away from and around the working fluid path. The efficiency of gas turbine engine 11 may be dependent upon the ability to control and minimize the leakage of this working fluid. Thus, the clearance between blade tip 19 of the turbine blade 16 and relatively static component 22 (e.g., blade shroud or casing) of the gas turbine engine assists in controlling the bypassing of rotor 17 and turbine blades 16 by the working fluid. The clearance or gap between the rotating blade 16 and static component 22 changes, e.g., with the expansion and contraction of the components due to the thermal cycling occurring in the gas turbine engine.

In some examples, the sealing system 20 comprises two corresponding components that form a virtual seal between rotating blades 16 and static component 22. The two components are abrasive coating 21 that is coupled to the turbine blade 16 on blade tip 19, and abradable coating 23, which is coupled to the static component 22. The abradable coating 23 may be formed on a portion of stationary substrate 22 (referred to as a blade shroud, casing, or runner in some cases) opposing blade tip 19, and may circumscribe rotor disk 17 and blades 16 while covering a portion of the stationary substrate 22.

Turbine blade 16 with abrasive coating 21 rotates relative to abradable coating 23 to wear-form blade track 52 (referred to in some examples as a seal track) in the abradable coating 23. The rotation of rotor disk 17 with turbine blades 16 coupled thereto allows the abrasive coating 21 to abrade abradable coating 23 when there is no clearance between the respective components. A particular attribute of abrasive coating 21 is the ability to withstand repeated and severe encounters with abradable coating 23 with only minimal loss of material from abrasive coating 21 and preferential wear of abradable coating 23. Thus, instead of a rubbing interface between coatings 21 and 23 when the radial clearance therebetween in not present abrasive coating 21 cuts abradable coating 23 to maintain a minimum clearance therebetween.

Put another way, as turbine blade 16 rotates during operation of engine 11, abrasive coating 21 on blade tip 19 of the turbine blade intentionally contacts abradable coating 23 on the opposing surface and wears away a portion of abrasive coating 23 to form a groove in abradable coating 23 corresponding to the path of turbine blade 16. The intimate fit between blade tip 19 and abradable coating 23 provides a seal, which may reduce or eliminate leakage of gas around blade tip 19 and increase the efficiency of gas turbine engine 11, e.g., by up to or even greater than 5 percent in some cases.

As will be described further below, abrasive coating 21 may include a plurality of abrasive particles in a metal matrix. For example, abrasive coating 21 may include a plurality of abrasive particles such as cubic boron nitride and/or other suitable particles in a metal alloy such as a titanium alloy, nickel alloy or other suitable metal alloy. Using example techniques described herein, the plurality of abrasive particles may protrude from the metal matrix to provide for improved abrasion of the abradable layer, e.g., as compared to an abrasive coating in which the abrasive particles do not protrude from the metal matrix. Additionally, abrasive coating 21 may define a thickness profile that allows for a substantially continuous seal between abrasive coating 21 and abradable coating 23 when abrasive coating 21 abrades abradable coating 23 during operation of engine 11.

Abradable coating 23 may have any suitable composition and porosity, and may be configured to be abraded by abrasive coating 21 when abrasive coating 21 is moved relative to abradable coating 23 when the coatings are in contact with each other. In some examples, abradable coating 23 may include a relatively porous ceramic layer comprising one or more of aluminum oxide, zirconium oxide, magnesium oxide, and the like. In some example, abradable coating 23 may include yttria-stabilized zirconia (YSZ), yttria-stabilized hafnia, rare earth oxides, rare earth silicates, or the like. Abradable coating 23 may provide thermal protection to substrate 22. In some cases, abradable coating 23 may include other elements or compounds to modify a desired characteristic of abradable coating 23, such as, for example, phase stability, thermal conductivity, or the like. Exemplary additive elements or compounds include, for example, rare earth oxides.

In some embodiments, abradable coating 23 may have a porosity greater than approximately 25 percent, such as, e.g., greater than approximately 40 percent. In some examples, abradable coating 23 may have a porosity between about 25 percent and about 50 percent, such as, e.g., between about 40 percent and about 50 percent. The porosity of abradable coating 23 may be dependent on the relatively hardness and/or porosity of abrasive coating 21 configured to abrade abradable coating 23, as described herein. For example, the porosity of abrasive coating 21 may be less than the porosity of abradable coating 23. In this manner, abradable coating 23 may provide for suitable thermal protection for the substrate of static component 22, while also allowing abradable coating 23 to be abraded when contacted by abrasive coating 21 on blade tip 19 to provide for a suitable seal between static component 22 and turbine blade 16.

Figure 4A:
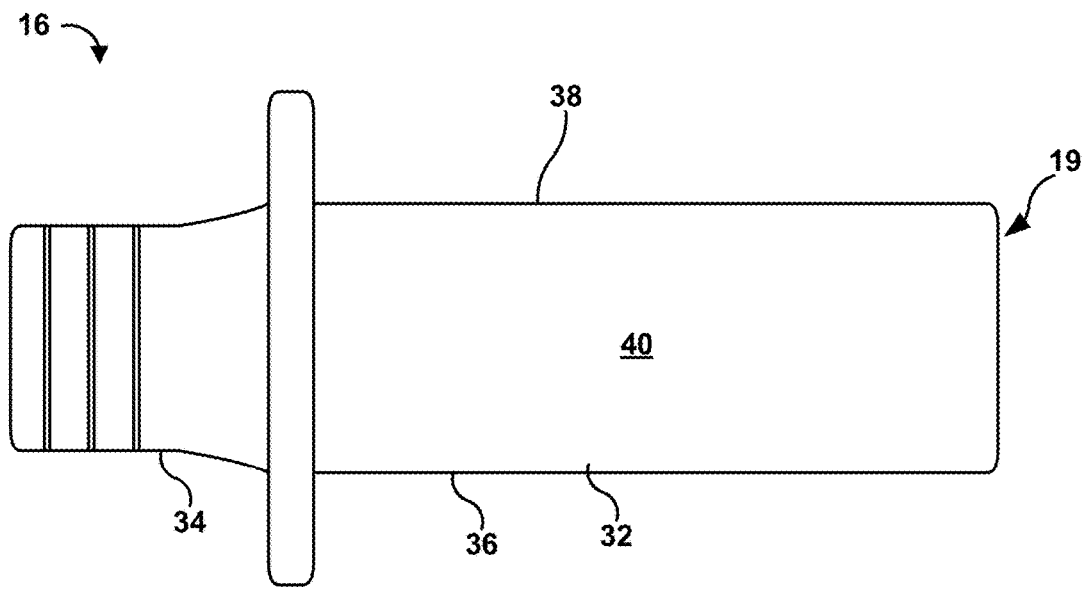
FIGS. 4A-4C are conceptual schematic diagrams of an example blade airfoil such as that shown in FIG. 3.
Figure 4B:
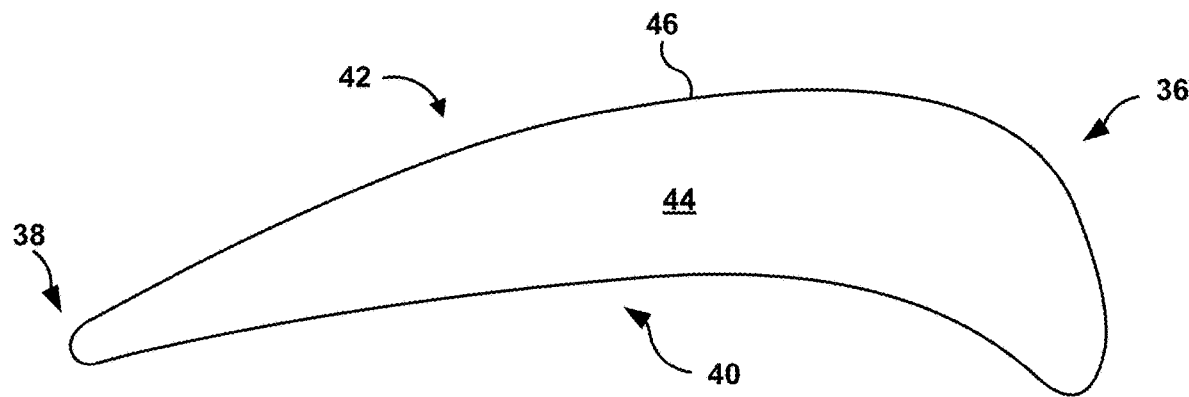
Figure 4C:
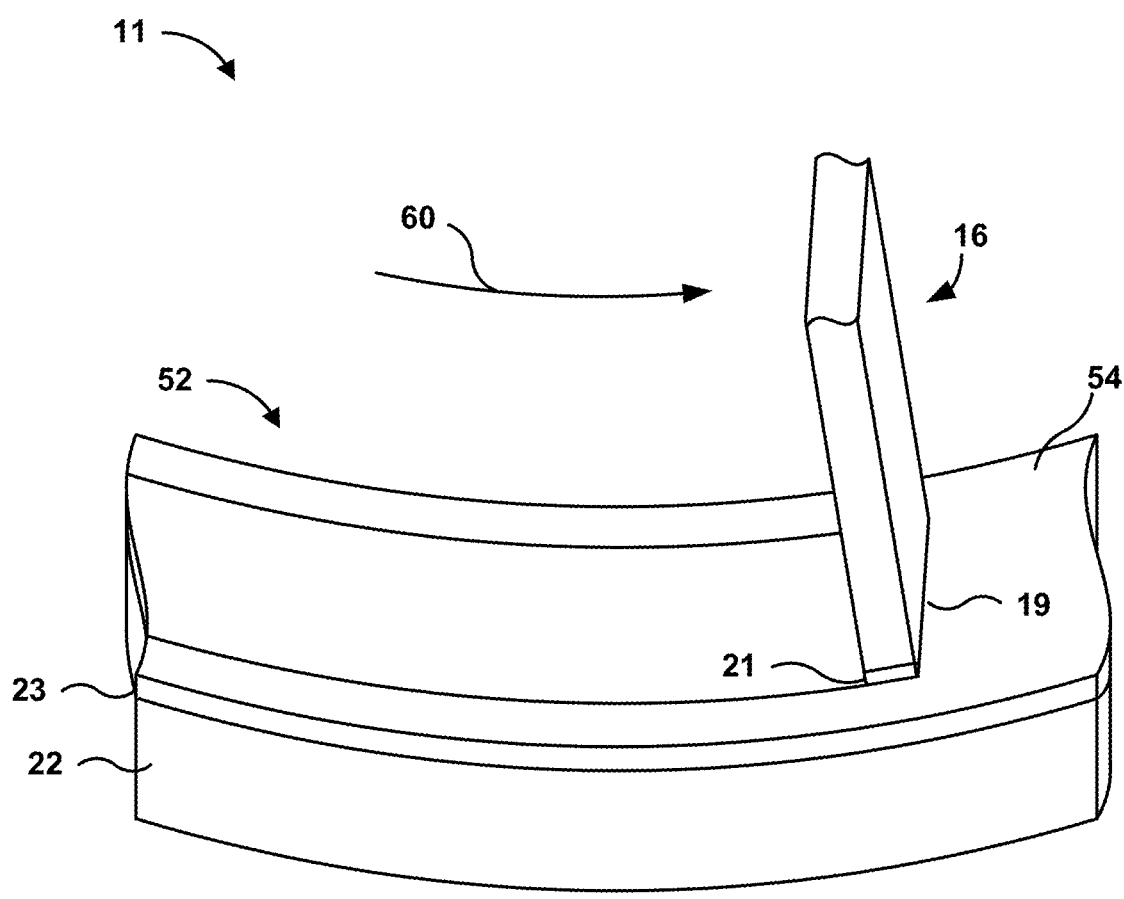

FIGS. 4A-4C are conceptual diagrams illustrating different views of an example blade, such as blade 16. Blade 16 generally includes airfoil 32 attached to stalk 34. Airfoil 32 includes a leading edge 36, a trailing edge 38, a pressure sidewall 40, and a suction sidewall 42. Pressure sidewall 40 is connected to suction sidewall 42 at leading edge 36 and trailing edge 38. Further, blade 16 defines blade tip 19, which is a surface substantially orthogonal to leading edge 36. Blade tip 19 is defined by an edge 46 which extends about the perimeter of the surface of blade tip 19, and separates the surface of blade tip 19 from the adjacent surface of airfoil 32. Leading edge 36, trailing edge 38, pressure sidewall 40, and suction side wall 42 generally extend from stalk 34 to edge 46.

As described above, blade 16 may be a component of a mechanical system including, e.g., a gas turbine engine. In different examples, blade 16 may be compressor blade that imparts kinetic energy into a fluid or a turbine blade that extracts kinetic energy from a moving fluid. FIG. 4C is a conceptual diagram further illustrating aspects gas turbine engine 11 with blade 16. Gas turbine engine 11 includes blade track 52, which is defined into a surface 54 of abradable coating 23 on static component substrate 22. Blade 16 includes abradable tip coating 21, which is described in greater detail below, formed on blade tip 19.

As described above, during operation of gas turbine engine 11, blade 16 rotates relative to blade track 52 on blade shroud or other static component 22 in a direction indicated by arrow 60. In general, the power and efficiency of gas turbine engine 11 can be increased by reducing the gap blade track 52 and blade 16, e.g., to reduce or eliminate gas leakage around blade 16. Thus, gas turbine engine 11, in various examples, is configured to allow abrasive coating 21 on tip 19 of blade 16 to abrade into surface 34 of abradable coating 23 on static component 22, thereby defining blade track 52 which creates a seal between blade track 52 and blade 16.

Abrasive tip coating 38, which is described in greater detail below, may be provided on blade tip 19 to improve different properties of an underlying blade surface including, e.g., wear, corrosion, hardness, and/or temperature resistance properties of an underlying blade surface. Additionally, or alternatively, a protective coating may be applied to an entire airfoil 32, including blade tip 19, to improve different properties of an underlying blade surface. In some examples, airfoil 32 may receive a coating that reduces or substantially eliminates the effects of oxidation or corrosion on airfoil 32.

Figure 5:
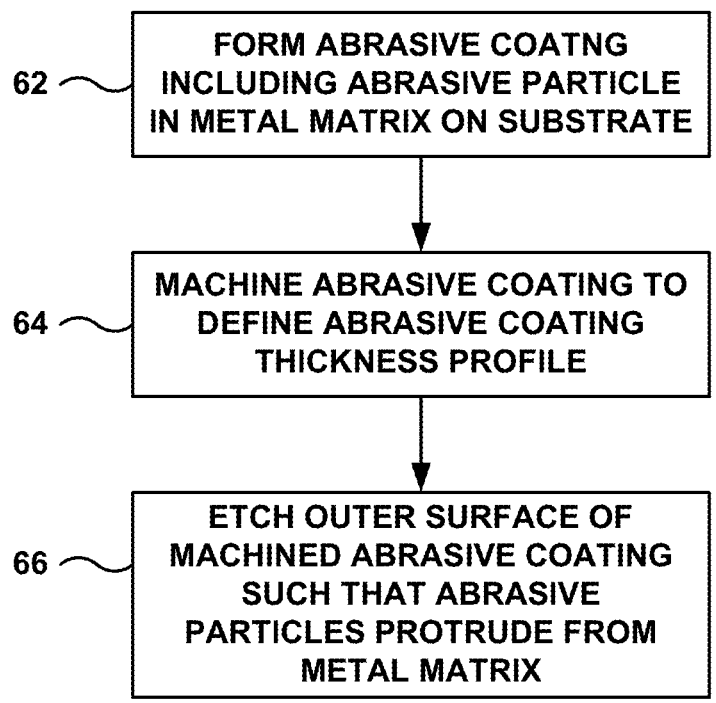
FIG. 5 is a flow diagram illustrating an example process for forming an abrasive coating on a substrate in accordance with some examples of the disclosure.

FIG. 5 is an example technique for forming an abrasive coating on a substrate. For ease of description, the example technique of FIG. 5 will be described with regard to the formation of abrasive coating 21 on blade tip 19 of blade 16 of gas turbine engine 11 described above. However, the example technique of FIG. 5 may be employed to form any abrasive coating including abrasive particles in a metal matrix material on any suitable substrate surface. In some examples, abrasive coating 21 may be formed on a surface of a blade vane. Such an example technique may be employed to form an abrasive coating on the surface of other components of gas turbine engine 11 or components of other systems in which abrasive coatings are desired.

Figure 6A:
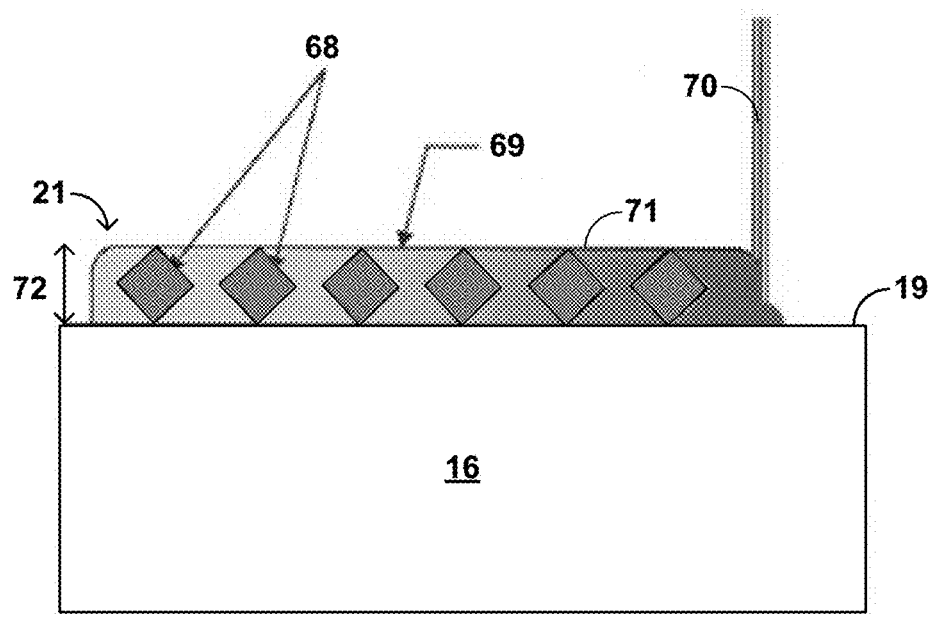
FIGS. 6A-6C are cross-sectional diagrams of a substrate at various stages throughout the example technique of FIG. 5.
Figure 6B:
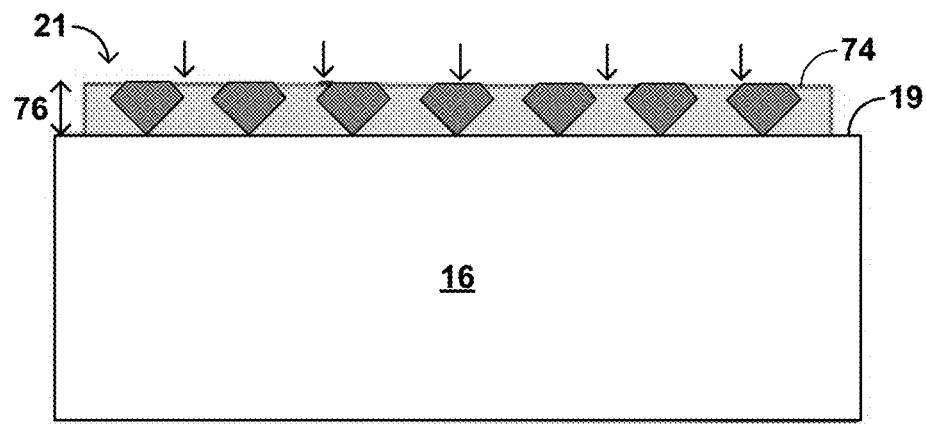
Figure 6C:
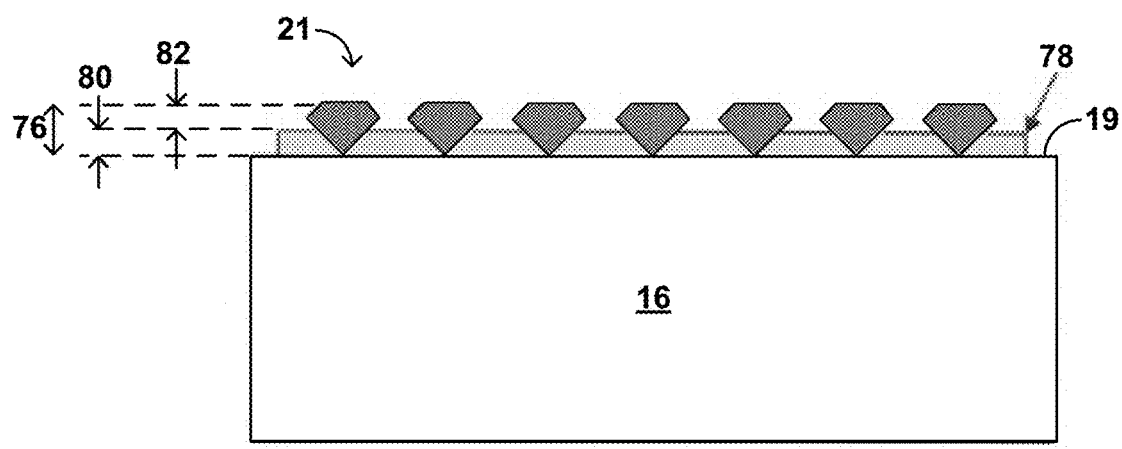

FIGS. 6A-6C are cross-sectional diagrams of blade 16 that illustrate the various stages throughout the application of abrasive coating 21 using the technique of FIG. 5. As shown in FIG. 6A, abrasive coating 21 may be formed on the outer surface of blade tip 19 of blade 16, where abrasive coating 21 includes a plurality of abrasive particles 68 in metal matrix 69 (62). Abrasive coating 21 may be deposited to cover the entire outer surface of blade tip 19 or only a portion of the outer surface of blade tip 19, e.g., the portion of blade tip 19 which contacts opposing surface of abradable coating 23 during operation of engine 11.

Any suitable material may be used for abrasive particles 68 and metal matrix 69. For example, abrasive particles 68 may include one or more of cubic boron nitride particles, carbide particles, metal carbide particles, metal oxide particles, nitride particles, metal nitride particles, such as silicon carbide, aluminum oxide, or silicon nitride. In some examples, abrasive particles 68 may have a particle size of about 15 mesh to 40 mesh, 300 mesh or smaller, larger than 60 mesh, or less than 80 mesh. Other particles sizes are contemplated. In some examples, the size of abrasive particles 68 may depend on a number of factors, such as, the thickness 72 of abrasive coating 21 after being deposited, as well as the thickness 76 of abrasive coating 21 after machining and/or the thickness 80 of abrasive coating 21 after machining and etching, as will be described below.

Abrasive particles 68 may have any suitable shape. As shown in FIG. 6A, e.g., abrasive particles 68 have a relative uniform diamond shape. In other examples, abrasive particles 68 may be non-uniform in shape (and size) and may be shapes other than diamond shape.

Any suitable composition may be used for metal matrix 69. For example, metal matrix 69 may include nickel, titanium, magnesium, cobalt, aluminum, chromium, and alloys thereof.

Abrasive coating 21 may have any suitable composition, e.g., that allows the coating to function as described herein. In some examples, abrasive coating 21 may include at least approximately 10 volume percent (vol %) of abrasive particles 68, such as, approximately 50 to approximately 80 vol %, or less than approximately 95 vol % of abrasive particles 68. Abrasive layer 21 may also include at least approximately 5 vol % of metal matrix 69, such as, approximately 20 to approximately 50 vol %, or less than approximately 90 vol % of metal matrix 69. Other amounts are contemplated.

Blade 16 may be formed of a material suitable for use in a high-temperature environment. In some examples, blade 16 includes titanium alloys, intermetallics and super alloys including, for example, an alloy based on nickel (Ni), cobalt (Co), Ni/iron (Fe), or the like. In examples in which substrate 12 includes a superalloy material, substrate 12 may also include one or more additives such as titanium (Ti), Co, or aluminum (Al), which may improve the mechanical properties of substrate 12 including, for example, toughness, hardness, temperature stability, corrosion resistance, oxidation resistance, or the like. In some examples, a superalloy may be utilized for substrate 16, including, for example, those available from Martin-Marietta Corp., Bethesda, Md., under the trade designation MAR-M247; those available from Cannon-Muskegon Corp., Muskegon, Mich., under the trade designation CMSX-3, CMSX-4, or CMXS-10; and the like.

Other suitable materials for blade 16 are contemplated. For example, in other embodiments, blade 16 may include a ceramic or ceramic matrix composite (CMC) substrate, although a change in bond-type chemistry and/or surface preparation from that used for superalloy substrates may be necessary for ceramic or CMC substrates. Blade 16 including a ceramic or CMC substrate may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave.

The filler composition, shape, size, and the like may be selected to provide the desired properties to the CMC. For example, the filler material may be chosen to increase the toughness of a brittle ceramic matrix. The filler may also be chosen to modify a thermal conductivity, electrical conductivity, thermal expansion coefficient, hardness, or the like of the CMC.

In some embodiments, the filler composition may be the same as the ceramic matrix material. For example, a silicon carbide matrix may surround silicon carbide whiskers. In other embodiments, the filler material may include a different composition than the ceramic matrix, such as aluminum silicate fibers in an alumina matrix, or the like. One preferred CMC includes silicon carbide continuous fibers embedded in a silicon carbide matrix.

Some example ceramics and CMCs which may be used for the substrate of blade 16 include ceramics containing Si, such as SiC and $Si_3N_4$; composites of SiC or $Si_3N_4$ and silicon oxynitride or silicon aluminum oxynitride; metal alloys that include Si, such as a molybdenum-silicon alloy (e.g., $MoSi_2$) or niobium-silicon alloys (e.g., $NbSi_2$); and oxide-oxide ceramics, such as an alumina or aluminosilicate matrix with a NEXTEL™ Ceramic Oxide Fiber 720 (available from 3M Co., St. Paul, Minn.).

As shown in FIG. 6A, abrasive coating 21 is formed on surface of blade tip 19. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, abrasive coating 21 may be directly on substrate 12. In other examples, one or more coatings or layers of coatings may be between abrasive coating 21 and blade tip 19.

As deposited, abrasive coating 21 may have any suitable thickness 72, which may be substantially uniform or non-uniform on blade tip 19. In some examples, thickness 72 may be greater than approximately 44 microns, less than 1000 microns, or approximately 175 to approximately 225 microns. Other thicknesses are contemplated. While FIG. 6A illustrates abrasive coating 21 being formed of a single layer, in other examples, abrasive coating 21 may be formed of multiple layers, e.g., multiple layers deposited sequentially on top of each other until an overall thickness 72 of abrasive coating 21 is achieved. While abrasive coating 21 is shown in FIG. 6A as having thickness 72 that is substantially equal to the thickness of abrasive particles 68, in other examples, thickness 72 may be greater than the thickness of abrasive particles 68.

Abrasive coating 21 may be formed on blade tip 19 using any suitable coating deposition technique. For example, FIG. 6A illustrates an example in which abrasive coating 21 is formed using a directed energy deposition technique. Using such a technique, blade 16 may be masked in some areas to define an exposed surface area, e.g., in the area of blade tip 19, onto which abrasive coating is to be formed. Energy source 70, e.g., in the form of a laser, may be directed at the materials of abrasive coating 21, e.g., in the form of powders or wire, on or above the surface of blade tip 19 to melt or sinter at least some of the materials (e.g., the metal matrix material but not the abrasive material) onto the surface of blade tip 19 which then solidify to form abrasive coating 21. The sintering or melting and cooling of metal matrix 69 may attach abrasive particles 68 to substrate 16.

In other examples, deposition techniques such as electroplating, plasma spray, or other spray processes may be used to form abrasive coating 21 on blade tip 19.

Once abrasive coating 21 is formed on blade tip 19, the top outer surface of abrasive coating 21 may be machined to remove a portion of abrasive coating 19 (64). Abrasive coating 21 may be machined to a desired shape and thickness. The machining may reduce abrasive coating 21 to thickness 76 from thickness 72 of abrasive coating 21 when initially formed. As such, thickness 76 may be less than thickness 72. In some examples, thickness 76 may be approximately 10% to approximately 95%, such as, approximately 50% to approximately 90% of thickness 72. In some examples, thickness 76 may be greater than approximately 20 microns, less than 800 microns, or approximately 50 microns to approximately 300 microns. Any suitable machining process may be used to machine abrasive coating 21, such as, diamond grinding, laser ablation, electrical discharge machining. The machining process may remove portions of metal matrix 69, abrasive particles 68, or both from abrasive coating 21.

Abrasive coating 21 may be machined such that the machined abrasive coating 21 defines a desired thickness profile. The layer thickness profile may refer to the thickness of abrasive coating 21 over the surface of blade tip 19, e.g., rather than the thickness at only one point on the surface of blade tip 19. The layer thickness profile of abrasive coating 21 after machining may be such that coating 21 is substantially uniform in thickness after machining or non-uniform in thickness. Using the machining of abrasive coating 21, a layer thickness profile for abrasive coating 21 may be provided such that abrasive coating 21 defines a substantially continuous and even seal between coating 21 and abradable coating 23 during operation. For example, even if the distance between the outer surface of blade tip 19 and abradable coating 23 and/or substrate 22 in not even, abradable coating 23 may be machined to a layer thickness profile that defines a substantially equal distance between the outer surface of abrasive coating 21 and the outer surface of blade track 52 when abrasive coating 21 abrades into abradable coating 23, e.g., during operation of engine 11.

In some examples, the abrasive coating thickness profile may refer to the thickness profile defined by the combination of abrasive coating 21 and the part on which abrasive coating 21 is applied. For example, the abrasive coating thickness profile may be defined to achieve a substantially uniform blade height (the overall height of blade 16 and coating 21) when rubbing or otherwise abrading into abradable coating 23 (e.g., rather than simply a uniform coating thickness). In a gas turbine engine 11 include a plurality of blades 16, each blade may be different in height before coating. The machining process may allow the abrasive coating 21 to be machined to a thickness profile that may be unique to each blade such that the overall thickness of each of the coated blades results in coated blades having a substantially uniform installed height, e.g., to prevent excess leakage around "shorter" or uneven uncoated blades. Put another way, in some examples, even though there may be variation in the uncoated height of individual blades of a plurality of blades, the machined abrasive coating thickness profile may result in the coated blades having substantially the same height, e.g., to allow for a substantially uniform seal with abradable coating 23 during operation.

Once the abrasive coating 21 has been machined to define an abrasive coating thickness profile (64), abrasive coating 21 may be surface etched to remove a portion of metal matrix 69 from around abrasive particles 68 such that the abrasive particles 68 are exposed and protrude out of metal matrix 69 (66). For example, in some cases, one or more individual particles of plurality of abrasive particles 68 may be covered entirely by metal matrix 69 after the initial formation of abrasive coating 21 (62) and machining of abrasive coating 21 (64). The etching of abrasive layer 21 to remove a portion of metal matrix 69 (66) may expose at least a portion of the covered particles 68, e.g., to increase the abrasiveness of abrasive coating 21. In other cases, the removal of metal matrix 69 via etching may also further expose surfaces of individual particles 68 that are partially exposed following formation and machining of abrasive layer 21.

Prior to the etching, portions of blade 16 may be masked to protect the substrate during the etching process. Any suitable etching process may be used. For example, abrasive coating 21 (along with masked portions of blade 16) may be immersed in an acid or electrolyte solution (e.g., for electrolytic etching). The portion of metal matrix 69 at or near the surface of abrasive coating 21 may be selectively removed, e.g., via etching such as electrolytic etching in which the etching process includes the use of electricity or etching including immersion without the application of electricity, to reveal cutting/abrading surfaces of abrasive particles 68, as described herein. Any suitable acid or electrolyte may be used based on the type of metal matrix 69. Different etchants may be suitable for different materials (e.g., since the various examples types of metal matrix 69 may have different corrosion resistance). In some examples, the etching process may remove only metal matrix 69 and not abrasive particles 68 from abrasive coating 21. Following the removal of a portion of metal matrix 69, the masking of blade 16 may be removed.

The removal of the metal matrix may reduce the thickness of metal matrix 69 to an etched thickness 80. In some examples, the etching may remove the same amount of metal matrix 69 over the entire surface abrasive coating 21 or may remove more metal matrix 69 from some portions of coating 21 compared to other portions. In some examples, following etching, thickness 80 of metal matrix 69 may be approximately 10% to approximately 95%, such as, approximately 60% to approximately 90% of thickness 76. In some examples, thickness 80 may be greater than approximately 20 microns, less than 760 microns, or approximately 12 microns to approximately 700 microns. Thickness 80 may be substantially uniform or non-uniform.

While metal matrix 69 may have thickness 80 that is less than the machine thickness 76 following the etching, particles 68 may remain at substantially the same thickness 76 as the machined layer thickness. As such, following etching, distance 82 particles 68 protrude from metal matrix 69 may be substantially equal to the difference between thickness 76 and post etching metal matrix thickness 80, as shown in FIG. 6C. In some examples, particles 68 protrude distance 82 of greater than approximately 1 micron, less than 760 microns, or approximately 8 microns to approximately 630 microns.

In some examples, by removing a portion of metal matrix 69 to expose the particles 68 and allow the particles 68 to protrude from metal matrix 69 of abrasive coating 21, cutting/abrasive surface of coating 21 may have increased cutting/abrasion effectiveness, e.g., as compared to an abrasive layer that is formed without machining or removal of a portion of the metal matrix, or only machined. The removal of metal matrix 69 may additionally or alternatively reduced rub on metal matrix 69 of abrasive coating 21 when abrasive coating 21 abrades abradable coating 23. This reduces frictional heating, improving strength and durability of coating.

While abrasive coating 21 is shown in FIGS. 6A-6C as being formed directly on turbine blade 16, in other examples one or more additional layers may be formed between abrasive coating 21 and blade 16. For example, interlayers may be used to modify the heat transfer from the coating to the substrate. Interlayers may be used to better match thermal expansion between the abrasive coating and the substrate.

Following formation of abrasive coating 21 according to the example technique of FIG. 5, blade 16 may be assembled as a component of engine 11. During operation of engine 11, abrasive coating 21 abrades into abradable coating 23 in the manner described above.

While examples of the disclosure have primarily been described with regard to the formation of abrasive coating 21 on blade tip 19 of blade 16 of gas turbine engine 11, in other examples, such an abrasive coating may be employed on a knife seal ring and/or compressor blade of a gas turbine engine.

Figure 7:
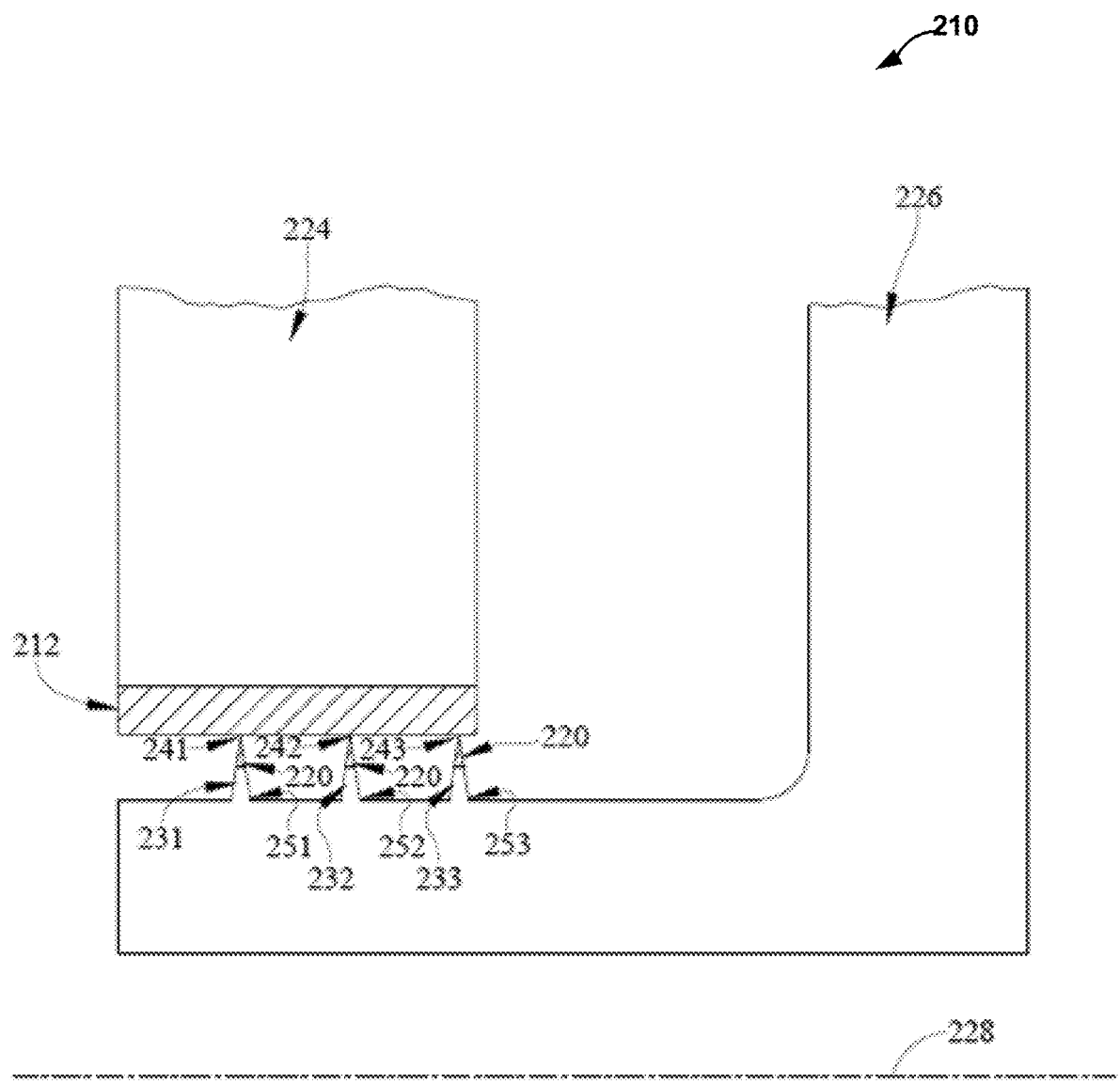
FIG. 7 is an is a cross-sectional view of a knife seal adapted for use in a gas turbine engine showing that the knife seal includes a coating applied to knife rings included in the knife seal

FIG. 7 is a cross-sectional view of a knife seal 210 configured for use in a gas turbine engine. As shown in FIG. 7, a knife seal 210 may be an example application of an example abrasive coating for a gas turbine engine component. In a knife seal, the annular runner 212 may be made of an abradable material. During normal operation of the gas turbine engine, knife rings 231, 232, and 233 may come in contact with the abradable material of the annular runner 212. The contact between knife ring 231, 232, and 233 and annular runner 212 abrades annular 212 and works to form a seal, effectively sealing airflow from the gas turbine engine. In particular, abrasive coating 220, which may be the same or substantially similar to that of abrasive coating 21 described above, defining knife edge 241, 242, 243 may allow the knife edge 241, 242, 243 to contact the abradable material on the annular runner 212 creating a more wear resistant seal. A more wear resistant seal will allow the part to stay in use for longer durations without needing replacement.

The annular runner 212 may be coupled to a static structure 224 included in a gas turbine engine. The knife rings 231, 232, 233 may each have an attachment edge 251, 252, 253, opposite the knife edges 241, 242, 243. The attachment edges 251, 252, 253 may be coupled to a rotor 226 included in a gas turbine engine so that the knife rings 231, 232, 233 rotate with the rotor 226 about an axis 228 during operation of the gas turbine engine. In illustrative example, knife seal 210 may be produced using the example techniques described herein for forming an abrasive coating on a gas turbine engine component, as described with regard to FIG. 5.

Knife seal 210 may be configured for use in a gas turbine engine and having a coating 220 is shown in FIG. 7. The knife seal 210 may include an annular runner 212 and a plurality of knife rings 231, 232, 233. The plurality of knife rings 231, 232, 233 may be arranged to contact the annular runner 212 to form a seal between the annular runner 212 and the knife rings 231, 232, 233 during operation of the gas turbine engine. The knife seal 210 may also include the coating 220 applied to a knife edge 241, 242, 243 of each knife ring 231, 232, 233 at the interface of the annular runner 212 and the knife rings 231, 232, 233.

Abrasive coating 220 may be similar to abrasive coating 21 described above and may protect the knife edges 241, 242, 243 of the knife rings 231, 232, 233 during operation of the gas turbine engine. The coating 220 may include a metal matrix and a plurality of abrasive particles. The metal matrix may be joined to the knife edges 241, 242, 243 of the knife rings 231, 232, 233 and may suspend the abrasive particles in place relative to the knife rings 231, 232, 233. Examples of gas turbine engines including knife seals may include one or more examples described in U.S. patent application Ser. No. 14/734,834 by Shuck (U.S. Patent Publication US 2015/0377039), the entire content of which is incorporated herein by reference.

Various examples of the disclosure have been described. Any combination of the described systems, operations, or functions is contemplated. These and other examples are within the scope of the following claims and clauses.

Clause 1. A method comprising forming an abrasive coating system on a substrate, the abrasive coating system comprising an abrasive coating including a plurality of abrasive particles in a metal matrix; machining the abrasive coating on the substrate to define a machined abrasive coating having an abrasive coating thickness profile; and etching an outer surface of the machined abrasive coating to remove a portion of the metal matrix and form an etched metal matrix such that the abrasive particles protrude from the metal matrix.

Clause 2. The method of clause 1, wherein forming the abrasive coating system on a substrate comprises depositing the plurality of abrasive particles and the metal matrix material on the substrate using directed energy deposition.

Clause 3. The method of any one of clauses 1 or 2, wherein the abrasive particles protrude about 1 micron to about 760 microns from the etched metal matrix.

Clause 4. The method of any one of clauses 1-3, wherein the etched metal matrix defines a thickness of about 20 microns to about 760 microns.

Clause 5. The method of any one of clause 1-4, wherein the abrasive coating defines a thickness of about 44 microns to about 1000 microns prior to machining.

Clause 6. The method of any one of clauses 1-5, wherein the abrasive particles comprise at least one of cubic boron nitride particles, metal carbide particles, metal nitride particles, or metal oxide particles.

Clause 7. The method of any one of clauses 1-6, wherein the metal matrix comprises at least one of nickel, titanium, magnesium, cobalt, aluminum, chromium, or alloys thereof.

Clause 8. The method of any one of clauses 1-7, wherein etching the outer surface of the machined abrasive coating comprises at least one of electrolytically etching the outer surface of the machine abrasive coating or etching via immersion of the outer surface of the coating into an acid.

Clause 9. The method of any one of clause 1-8, wherein the substrate comprises a blade of a gas turbine engine, wherein the abrasive coating is formed on a blade tip of the blade, and wherein the abrasive coating system of the blade tip is configured to abrade an abradable layer of a blade track during operation of the gas turbine engine.

Clause 10. The method of clause 9, wherein the abrasive coating thickness profile of the machine abrasive coating is defined such that a substantially continuous seal is formed between the blade and blade track during the operation after the abrasive coating has abraded the abradable layer of the blade track during the operation.

Clause 11. The method of any one of clauses 1-8, wherein the substrate comprises superalloy substrate.

Clause 12. The method of any one of clauses 1-11, wherein the abrasive coating comprises a plurality of abrasive layers, wherein each abrasive layer comprises the plurality of abrasive particles in the metal matrix, wherein forming the abrasive coating system on a substrate comprises sequentially forming the plurality of abrasive layers on the substrate.

Clause 13. A gas turbine engine system comprising a first component; an abrasive coating on at least a portion of the first component; a second component; and an abradable coating on at least a portion of the second component, wherein the abrasive coating comprises a plurality of abrasive particles protruding from a metal matrix, and wherein, during operation of the gas turbine engine, the first component is configured to move relative to the second component such that the abrasive coating abrades into the abradable coating.

Clause 14. The system of clause 13, wherein the first component comprises at least one of a turbine blade or a turbine vane.

Clause 15. The system of any one of clauses 13 or 14, wherein the second component comprises at least one of a turbine shroud or a turbine blade track.

Clause 16. The system of clause 13, wherein the first component comprises a knife ring.

Clause 17. The system of any one of clauses 13 or 16, wherein the second component comprises a knife runner.

Clause 18. The system of any one of clauses 13-17, wherein the first component comprises a superalloy substrate.

Clause 19. The system of any one of clauses 13-18, wherein the abrasive particles protrude about 1 micron to about 760 microns from the etched metal matrix.

Clause 20. The system of any one of clauses 13-19, wherein the abrasive particles comprise at least one of cubic boron nitride particles, metal carbide particles, metal nitride particles, or metal oxide particles.

Clause 21. The system of any one of clauses 13-20, wherein the metal matrix comprises at least one of nickel, titanium, magnesium, cobalt, aluminum, chromium, or alloys thereof.

Clause 22. The system of any one of clause 13-21, wherein the first component comprises a blade of a gas turbine engine, wherein the abrasive coating is formed on a blade tip of the blade, wherein the second component comprises a blade track, and wherein the abrasive coating on the blade tip is configured to abrade the abradable layer on the blade track during operation of the gas turbine engine.

Clause 23. The system of clause 22, wherein the abrasive coating thickness profile of the machine abrasive coating is defined such that a substantially continuous seal is formed between the blade and blade track during the operation after the abrasive coating has abraded the abradable layer of the blade track during the operation.

Clause 24. The system of any one of clauses 13-23, wherein the substrate comprises superalloy substrate.

Clause 25. The system of any one of clauses 13-24, wherein the abrasive coating comprises a plurality of abrasive layers, and wherein each abrasive layer comprises the plurality of abrasive particles in the metal matrix.

The invention claimed is:

1. A method comprising:
    depositing a plurality of abrasive particles and a metal matrix material on a substrate;
    melting the metal matrix material via a directed energy source, wherein, upon solidification, the molten metal matrix material forms a metal matrix that attaches the plurality of abrasive particles to the substrate, wherein the metal matrix and the plurality of abrasive particles define an abrasive coating on the substrate;
    machining the abrasive coating on the substrate to define a machined abrasive coating having an abrasive coating thickness profile; and
    etching an outer surface of the machined abrasive coating to remove a portion of the metal matrix and form an etched metal matrix such that the abrasive particles protrude from the metal matrix.

2. The method of claim 1, wherein the abrasive particles protrude about 1 micron to about 760 microns from the etched metal matrix.

3. The method of claim 1, wherein the etched metal matrix defines a thickness of about 20 microns to about 760 microns.

4. The method of claim 1, wherein the abrasive coating defines a thickness of about 44 microns to about 1000 microns prior to machining.

5. The method of claim 1, wherein the abrasive particles comprise at least one of cubic boron nitride particles, metal carbide particles, metal nitride particles, or metal oxide particles.

6. The method of claim 1, wherein the metal matrix comprises at least one of nickel, titanium, magnesium, cobalt, aluminum, chromium, or alloys thereof.

7. The method of claim 1, wherein etching the outer surface of the machined abrasive coating comprises at least one of electrolytically etching the outer surface of the machine abrasive coating or etching via immersion of the outer surface of the coating into an acid.

8. The method of claim 1, wherein the substrate comprises a blade of a gas turbine engine, wherein the abrasive coating is formed on a blade tip of the blade, and wherein the abrasive coating system of the blade tip is configured to abrade an abradable layer of a blade track during operation of the gas turbine engine.

9. The method of claim 8, wherein the abrasive coating thickness profile of the machine abrasive coating is defined such that a substantially continuous seal is formed between the blade and blade track during the operation after the abrasive coating has abraded the abradable layer of the blade track during the operation.

10. The method of claim 1, wherein the substrate comprises superalloy substrate.

11. The method of claim 1, wherein the abrasive coating comprises a plurality of abrasive layers formed sequentially on the substrate, and wherein each abrasive layer comprises the plurality of abrasive particles in the metal matrix.

12. The method of claim 1, wherein melting the metal matrix material via the directed energy source comprises melting the metal matrix material via a laser.

13. The method of claim 1, wherein, prior to machining the abrasive coating, the abrasive coating defines a thickness on the substrate that is greater than a thickness defined by the plurality of abrasive particles on the substrate.

14. The method of claim 1, wherein depositing the plurality of abrasive particles and the metal matrix material on the substrate comprises depositing a powder including the plurality of abrasive particles and the metal matrix material on the substrate.

15. The method of claim 1, wherein depositing the plurality of abrasive particles and the metal matrix material on the substrate comprises depositing a wire including the plurality of abrasive particles and the metal matrix material on the substrate.

16. A method comprising:
    sequentially forming a plurality of abrasive layers on a substrate to form an abrasive coating on the substrate including the plurality of abrasive layers, wherein each respective abrasive layer of the plurality of abrasive layers is formed by at least:
        depositing a plurality of abrasive particles and a metal matrix material on the substrate,
        melting the metal matrix material via a directed energy source, wherein, upon solidification, the molten metal matrix material forms a metal matrix that attaches the plurality of abrasive particles to the substrate, wherein the metal matrix and the plurality of abrasive particles define the respective abrasive layer on the substrate;
    machining the abrasive coating on the substrate to define a machined abrasive coating having an abrasive coating thickness profile; and
    etching an outer surface of the machined abrasive coating to remove a portion of the metal matrix and form an etched metal matrix such that the abrasive particles protrude from the metal matrix.

17. The method of claim 16, wherein melting the metal matrix material via the directed energy source comprises melting the metal matrix material via a laser.

18. The method of claim 16, wherein depositing the plurality of abrasive particles and the metal matrix material on the substrate comprises depositing a powder including the plurality of abrasive particles and the metal matrix material on the substrate.

19. The method of claim 16, wherein depositing the plurality of abrasive particles and the metal matrix material on the substrate comprises depositing a wire including the plurality of abrasive particles and the metal matrix material on the substrate.

20. The method of claim 16, wherein the abrasive particles comprise at least one of cubic boron nitride particles, metal carbide particles, metal nitride particles, or metal oxide particles, wherein the metal matrix comprises at least one of nickel, titanium, magnesium, cobalt, aluminum, chromium, or alloys thereof, and wherein the substrate comprises superalloy substrate.

* * * * *